United States Patent
Bonardi

(10) Patent No.: US 6,231,302 B1
(45) Date of Patent: May 15, 2001

(54) THERMAL CONTROL SYSTEM FOR GAS-BEARING TURBOCOMPRESSORS

(76) Inventor: G. Fonda Bonardi, 1450 23rd St., Santa Monica, CA (US) 90404

(*) Notice: Subject to any disclaimer, the term of this patent is extended or adjusted under 35 U.S.C. 154(b) by 0 days.

(21) Appl. No.: 09/327,917

(22) Filed: Jun. 8, 1999

(51) Int. Cl.$^7$ ....................................................... F01D 3/00
(52) U.S. Cl. ..................... 415/105; 415/107; 415/111; 415/229; 417/365; 417/407
(58) Field of Search .................... 415/104, 105, 415/106, 107, 111, 112, 214.1, 229, 102, 96; 417/365, 406, 407; 384/121, 124

(56) References Cited

U.S. PATENT DOCUMENTS

| | | | |
|---|---|---|---|
| 3,410,616 | * 11/1968 | Dee | 417/407 |
| 3,740,163 | * 6/1973 | Schinnerer et al. | 415/111 |
| 4,355,850 | * 10/1982 | Okano | 308/9 |
| 4,472,107 | * 9/1984 | Chang et al. | 415/104 |
| 4,808,070 | 2/1989 | Fonda-Bonardi . | |
| 5,567,129 | 10/1996 | Bonardi . | |

* cited by examiner

Primary Examiner—Edward K. Look
Assistant Examiner—Ninh Nguyen
(74) Attorney, Agent, or Firm—James E. Brunton, Esq.

(57) ABSTRACT

A thrust control system for use with a turbocompressor having gas bearings. More specifically, the system concerns an arrangement of gas bearings for use in a turbocompressor or other device where a large temperature difference between the turbine and the compressor housing could cause unacceptable performance of the turbocompressor thrust bearings if located in proximity of the turbine and compressor wheels. This danger is obviated in the system by relocating the gas thrust bearings so as to minimize the axial distance between them. This configuration affords the additional advantage that gasses of different composition may be separately used as a seal gas in cases where the process gas in the turbine and compressor are incompatible.

13 Claims, 3 Drawing Sheets

THERMAL CONTROL SYSTEM FOR GAS-BEARING TURBOCOMPRESSORS

BACKGROUND OF THE INVENTION

1. Field of the Invention

The present invention relates generally to gas bearing turbocompressors. More particularly, the invention concerns turbocompressors embodying gas bearings wherein large temperature differences develop between the turbine and the compressor ends of the device, such as is the case in turbochargers for internal combustion engines where the turbine is driven by hot exhaust gases and the compressor receives cool intake air.

2. Discussion of the Invention

Turbocompressors have been in use as turbochargers for internal combustion engines for many years. These types of turbocompressors have generally embodied oil-lubricated bearings. The trend in recent years in turbocompressor design has been towards higher compression ratios requiring higher revolutions per minute (RPM) of the spindle of the turbocompressor and resulting in higher exhaust temperatures. Under such conditions oil lubrication of the bearings becomes inadequate and can possibly result in cavitation in the bearings as a result of the higher rubbing speed, and in thermal decomposition as a consequence of the higher temperatures. A solution to the aforementioned problems is provided by the use of gas bearings such as the bearings disclosed in U.S. Pat. No. 4,808,070 issued to the present inventor. The novel gas bearings disclosed in U.S. Pat. No. 4,808,070 can easily handle the required RPM and rubbing speeds of most types of modern turbo compressors.

In a typical turbocharger the compressor is fed through a filter which causes a significant pressure drop at the inlet to the compressor resulting in an inlet pressure lower than the atmosphere. On the other hand, the conventional turbine discharges to atmosphere through a muffler or catalytic converter also causing a pressure drop which results in a pressure higher than atmosphere at the exhaust of the turbine. The resulting pressure difference between the compressor housing and the turbine housing causes a net thrust to develop in the shaft connecting the compressor wheel and the turbine wheel. In an oil-lubricated turbo-charger this thrust is absorbed by a traditional oil-lubricated thrust washer. However, in the case of gas bearings the thrust is typically compensated by the arrangement described in U.S. Pat. No. 5,567,129 issued to the present inventor. Because of the relevance of the U.S. Pat. Nos. 4,808,070 and 5,567,129 to a complete understanding of the present invention, both of these patents are hereby incorporated by reference as though fully set forth herein.

As previously mentioned, the thrust of the present invention is directed towards solving the problems caused by large temperature differences between the ends of the turbocompressor. In this regard, the correct operation of the thrust bearings discussed in U.S. Pat. No. 5,567,129 depends in large measure on maintaining the correct clearances in the gaps between the stationary and moving parts of the thrust bearings. These gap dimensions are affected by changes in length of the housing and the length of the shaft due to thermal expansion. Such changes are particularly large if the temperature distribution in the housing differs appreciably from the temperature distribution in the shaft and the thermal expansion coefficient of the shaft differs substantially from that of the housing. These conditions result in serious operating problems. For example, if the shaft elongates more than the housing, the gaps increase thus decreasing the stiffness of the thrust bearings and increasing the parasitic mass flow through the bearings. Similarly, if the housing elongates more than the shaft the gaps may completely close resulting in contact of the facing surfaces of the adjoining components thereby resulting in severe damage to the bearings.

Other problems can occur if the gas flowing in the compressor is not compatible with gas flowing in the turbine. This latter problem can be solved by supplying gas to the thrust bearings from an independent source, which gas is compatible with the gas flowing in the turbine and compressor.

Although this invention is presented primarily in the context of turbochargers for use with internal combustion engines, the arrangement of the component parts also solves a different problem of great importance in the context of turbo-compressors for supplying air to fuel cells (see for example U.S. Pat. No. 5,523,176 issued to the present inventor). This problem concerns the danger of oil contamination in the supplied air, which contamination can poison the catalyst in the fuel cell. The turbocompressor of the present invention also permits the use of a buffer gas where any mixing of the gasses in the expander and compressor housings must be positively prevented.

SUMMARY OF THE INVENTION

It is an object of the present invention to provide an improved gas bearing system for use in a turbocompressor or similar device which embodies radial gas bearings and thrust gas bearings which can tolerate large temperature difference between the turbine and the compressor. More particularly, it is an object of the invention to provide an improved system of the aforementioned character in which two opposing gas thrust bearings are brought into close axial proximity so as to minimize the length over which temperature gradients can cause a variation of the built-in gap dimensions in the gas thrust bearings.

Another object of the invention is to provide an apparatus as described in the preceding paragraphs in which the gas supplied to either of the thrust bearings can be other than the process gas used in the turbine and expander.

A further object of the invention is to provide a turbocompressor of the class described in which the gas supplied to the thrust bearings performs the function of seal gas to prevent any intermixing of the compressor process gas into the turbine process gas or vice-versa.

DESCRIPTION OF THE INVENTION

Figure 1:
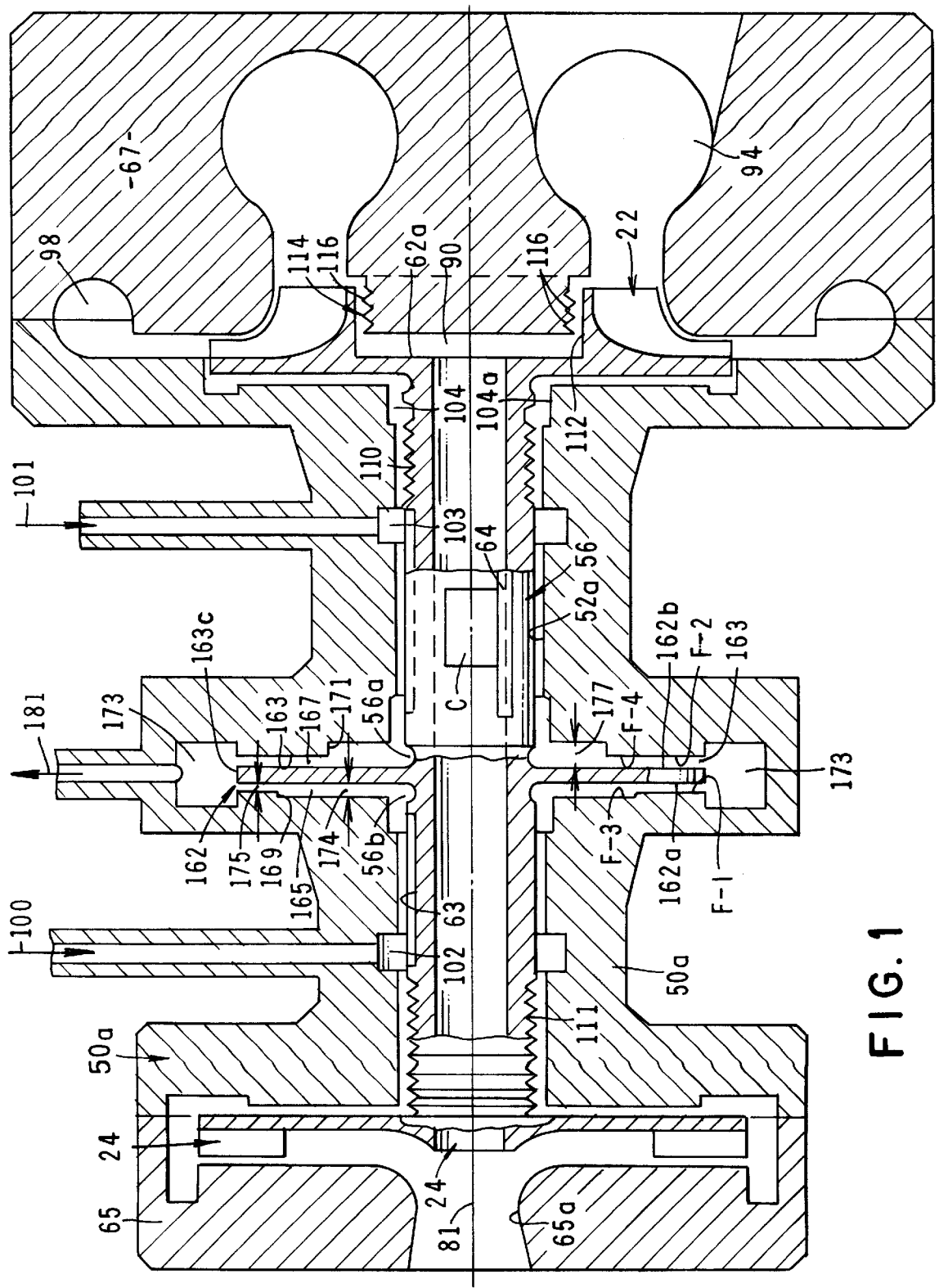
FIG. 1 is a diagrammatic, side elevation, cross-sectional view of a gas bearing turbocompressor apparatus illustrating one embodiment of the present invention in which the opposing thrust bearings are disposed in close axial proximity and are provided with independent gas supply sources.
Figure 2:
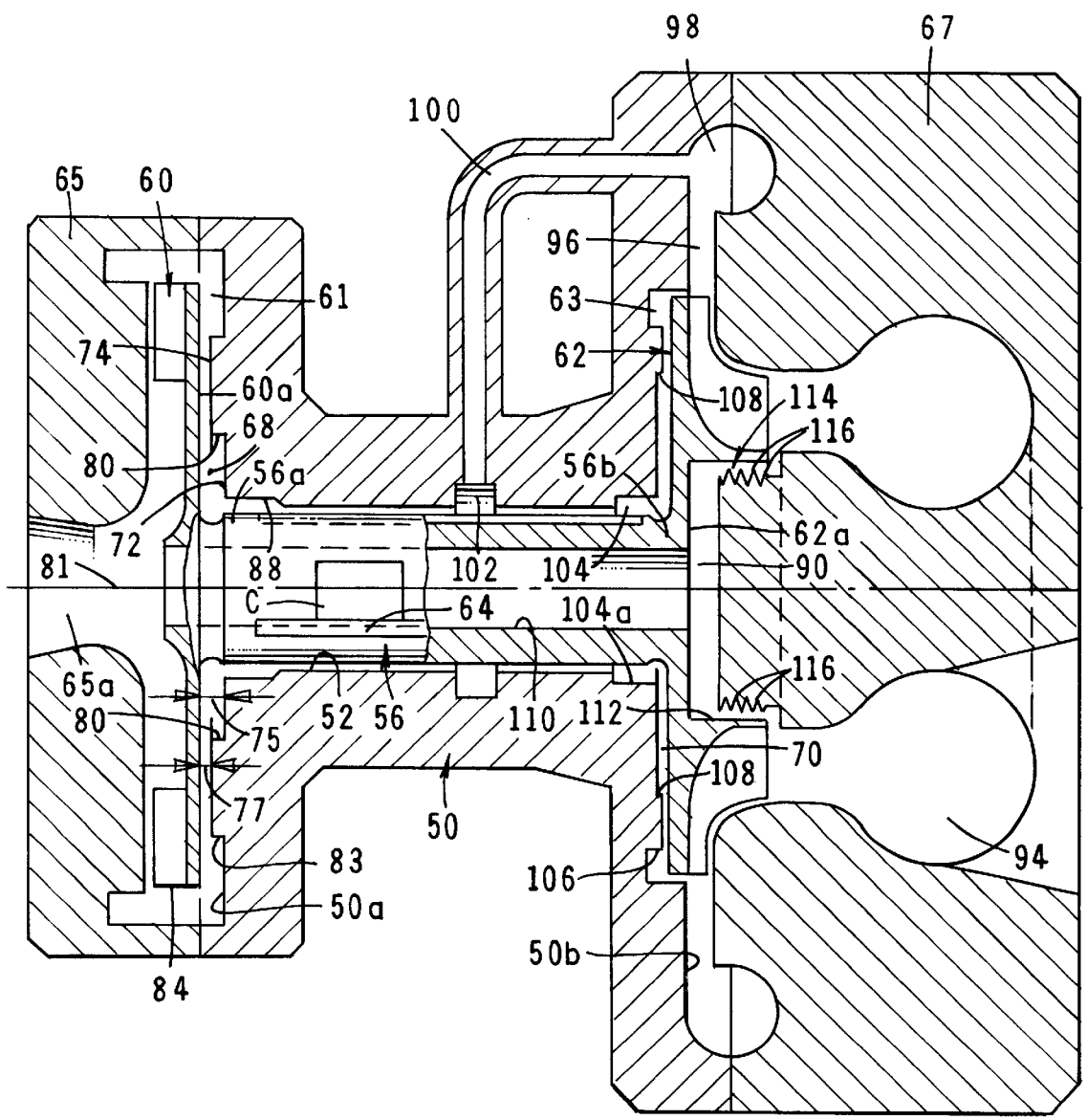
FIG. 2 is a reproduction of FIG. 2 of incorporated by reference U.S. Pat. No. 5,567,129.

Referring to the drawings and particularly to FIG. 1, one form of the improved apparatus of the invention is there shown. The apparatus shown in FIG. 1 can be best understood by a comparison of FIG. 1 of the drawings with FIG. 2 of U.S. Pat. No. 5,567,129, which was issued to the present inventor and which is incorporated herein by reference. Referring particularly to FIG. 2, this figure shows a turbocompressor equipped with two thrust bearings and one compensation chamber. One thrust bearing, which is identified by number 68, is located proximate wheel 60 and comprises the volume between the inboard surface 60a of the turbine wheel 60 and face portions 72 and 74 of support housing 50. As indicated in FIG. 2, face portion 72 is spaced from surface 60a by a gap distance identified by the numeral 75, while face 74 is spaced from surface 60a by a gap distance identified by the numeral 77. Forming a boundary between face portions 72 and 74 is a step 80. Step 80 is generally circular in shape and is concentric with the axis 81 of shaft 56. Outer edge 84 of turbine wheel 60 and a relief edge designated as 83, which functions to define the outer boundary of thrust bearing 68, are both concentric with axis 81. It is to be noted that the inner boundary of thrust bearing 68 is defined by an edge 88 which communicates directly with grooves 64 formed on shaft 56.

A second thrust bearing 70, which is similar to thrust bearing 68, is located proximate wheel 62. Thrust bearing 70, in exact analogy to thrust bearing 68, comprises a first face portion extending from the surface 104a to concentric step 108 and a second face portion extending from concentric step 108 to outer edge 106, both being parallel to the inboard surface of compressor wheel 62. The gaps separating the facing surfaces on the compressor side are not specifically numbered in this figure, because they are mirror images of the gaps 75 and 77, which are disposed proximate turbine wheel 60, and perform the same function of generating an axial force as a function of the axial displacement of shaft 56 within housing 50. The forces generated by the thrust bearings are axially opposite to each other thereby causing the shaft to seek an axial position where the two opposing forces are equal in magnitude. Any displacement from this position causes the gaps on one side to widen and causes the corresponding force to decrease while simultaneously causing the gaps on the other side to narrow by an equal amount and causing the corresponding force to increase. The net difference between the axial forces tends to urge the shaft back toward its equilibrium position.

The performance of the thrust bearings depend critically on the dimension of the gaps in relation to the dimensions of the step. This aspect is discussed in detail in the disclosure of incorporated by reference U.S. Pat. No, 5,567,129 and any change in the relative dimensions can be detrimental to the correct operation of the bearings. In particular, if the gaps of both bearings increase (as opposed to the condition where one side decreases while the other side increases, as in the case of axial displacement), then the stiffness of the bearing system decreases. On the other hand, if the gaps on both sides decrease to zero, then contact of the moving surfaces will occur and severe damage to the bearings can result.

Gap changes of the character described in the preceding paragraph are due to the change in the length of housing 50 and shaft 56 caused by temperature transients and differences in thermal expansion. Obviously, the gaps widen if the shaft 56 elongates more than the housing 50. Conversely, the gaps narrow in the opposite case. The change in gap width is proportional to the difference in temperature, the differences (if any) in thermal expansion coefficients, and the distance between the bearings, equal to the length of the shaft 56.

The temperature differences depend on the state of the gases being processed and cannot be changed. The differences in thermal expansion coefficients can be eliminated by using similar materials for the shaft and housing respectively. The distance between the bearings can be minimized by design. This novel design change, which is at the heart of the present invention, is uniquely accomplished by moving the thrust bearings from the location shown in FIG. 2 to the new location shown in FIG. 1. More particularly, as shown in FIG. 2, the flat faces of the thrust bearings 68 and 70, as defined by the back faces of the turbine wheels 60 and 62, are moved to the opposite sides of a single element 162 which is located within a central or intermediate chamber 163. In this regard, support housing 50a, which generally corresponds to support housing 50 of the '129 patent, is provided with first, second, third and fourth spaced-apart faces F-1, F-2, F-3, and F-4 respectively with chamber 163 being disposed between faces F-3 and F-4. With this construction, element 162 is strategically positioned between the two radial bearings each being characterized by longitudinal grooves 64 and recesses or cavities "C" which are described in detail in U.S. Pat. No. 4,808,070. As best seen in FIG. 1, element 162 comprises a substantially flat, thin disk with parallel first and second smooth faces, 162a and 162b. These faces define a third chamber comprising new first thrust bearing 165 on one face and a fourth chamber comprising second new thrust bearing 167 on the other face. As indicated in FIG. 1, the first and second recessed areas of the new thrust bearings extend from the shaft 56 radially out to steps identified by numbers 169 and 171 respectively, each being concentric with the axis 81 of shaft 56. As depicted in FIG. 1, shaft 56 rotates within generally cylindrically shaped bore 52a of housing 50a. The axial width of the recesses are defined in FIG. 1 by the numerals 174 and 175 respectively. With the construction thus described and shown in FIG. 1, the radial passageways discharge into a common volume 173 which is located beyond the edge 163c of disk 162.

In operation of the improved apparatus of the invention, a first seal gas having a composition compatible with the process gas flowing through turbine 24 is supplied through a first supply means or inlet 100 to a circumferential groove 102 which is machined in the inner surface of housing 50a. The seal gas then flows through longitudinal grooves 63 (identical to grooves 64 in the radial bearings of the '129 patent) to circumferential groove 56b, where it enters gap 174, hence a gap to 175 and is then discharged to common volume 173. Labyrinth 111 substantially restricts the outflow of the first gas from groove 102 to the environment of turbine 24 (see also the '129 patent).

In similar fashion, a second seal gas of composition compatible with the process gas flowing through compressor 22 is supplied through a second supply means or inlet 101 to circumferential groove 103. From groove 103 the seal gas flows through longitudinal grooves 64 to circumferential grove 56a, where it enters gap 177, and is discharged to common volume 173. Labyrinth 110 substantially restricts the outflow of said second gas from groove 103 to the environment of compressor 22 (see also the '129 patent).

It is to be understood that first and second seal gases can be of the same or different compositions. For example, a single source of gas can be used to supply the first and second seal gases if one gas is compatible with both the turbine process gas and the compressor process gas. This is the case, for example, if the turbocompressor is used in conjunction with a fuel cell where the compressor process gas is ambient air and the turbine discharges to the atmosphere. In this instance, the seal gas for both sides can be taken directly from the compressor diffuser as shown in FIG. 2. The used seal gas is vented from volume 173 through outlet 181 where it can be recovered and reprocessed if so desired. (As for example, where discharge of the gas to the atmosphere would be environmentally objectionable or otherwise cost ineffective).

The configuration described in the preceding paragraphs solves problems resulting from temperature gradients on the gaps in the thrust bearings. Since the distance between the opposed thrust bearings is the thickness of disk 162, the temperature difference between the two thrust bearings is minimal even if the difference between the temperatures of the turbine and compressor is large. Furthermore, under transient conditions a temperature difference between the housing, which determines the distance between the recessed faces of the thrust bearings through the thermal expansion coefficient of the housing, and the disk, which determines the distance between the flat faces of the thrust bearings through the thermal expansion coefficient of the disk, has minimal effect on the width of the gaps, determined as the difference between the expansion of the housing and the expansion of the disk, since the length over which thermal expansion operates is minimal.

Figure 3:
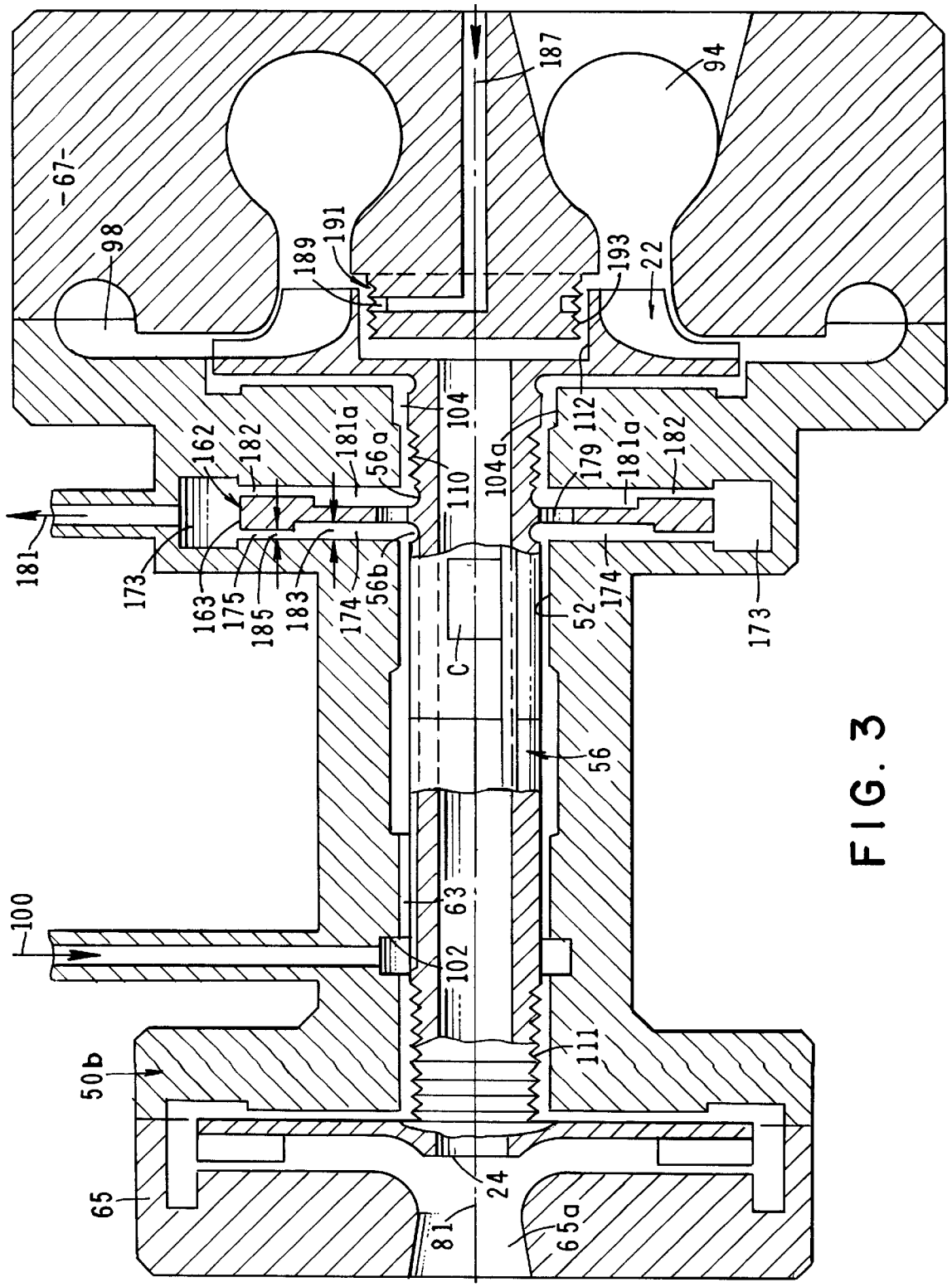
FIG. 3 is diagrammatic, side elevational, cross-sectional view showing an alternate form of the invention which is useful in cases where the central portion of the device is encumbered by auxiliary apparatus, such as an integral electric motor.

Referring next to FIG. 3, this figure shows an alternate form of the improved apparatus. This alternate embodiment is similar in many respects to the earlier described embodiment, but is particularly useful when the central portion of the housing is used to contain auxiliary equipment such as an electric motor for driving the compressor when the power delivered by the turbine is insufficient to develop the desired pressure ratio in the compressor.

In the embodiment of the invention shown in FIG. 3, where like numbers are used to identify like components, the assembly of both thrust bearings is moved from between the two radial bearings to a position between one radial bearing and the corresponding labyrinth. Other variations of detail are also shown in FIG. 3, any one of which may be used singly or in combination depending on the end application of the apparatus without departing from the spirit of the invention.

Referring particularly to FIG. 3, there is shown a single gas inlet 100 for the seal gas, a useful simplification if the seal gas is compatible with both the turbine process gas and the compressor process gas. In this case the seal gas is admitted through circumferential groove 102 in the housing 50*b* and delivered through longitudinal grooves 63 to circumferential groove 56*b* in the shaft, thence to gaps 174 and 175 of the first thrust bearing and finally out to volume 173. The second thrust bearing receives seal gas through openings 179 formed in disk 162 in the proximity to shaft 56, forming a direct channel of communication between circumferential grooves 56*a* and 56*b*. From groove 56*a* the gas then proceeds through gaps 181 and 182 to collecting volume 173.

Another important variation is shown in FIG. 3, wherein the smooth and recessed faces are transposed in either one or both bearings. In particular, FIG. 3 shows both bearings being transposed. In this configuration, the recesses having axial widths 183 and 185 respectively are located on the stepped faces of disk 162, whereas the faces of the housing are smooth.

Additionally, a further variation shown in FIG. 3 involves the provision of a third gas supply means or third gas inlet 187 which is provided in or near the axis of support member 67. This third gas inlet is interconnected with a circumferential groove 189 located in the middle of labyrinth 191, and is provided with teeth 193 on either side. A seal gas compatible with both expander and compressor process air is admitted to the middle of the labyrinth and positively prevents any admixture of compressor gas present in inlet manifold 94 with expander gas present in the exhaust manifold 65*a* of turbine 24 via hollow shaft 56.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A turbocompressor comprising:
    (a) a support having a longitudinally extending bore, generally circular in cross section at any point, said bore defining an inner surface, said support being disposed within a fluid atmosphere and including longitudinally spaced first, second, third and fourth faces, said third and fourth faces having a recess provided therein which is concentric with said bore and in fluid communication therewith, said third and fourth faces defining an intermediate chamber there between;
    (b) an elongated generally cylindrical shaft rotatable within said bore of said support, said shaft having first and second ends and an intermediate portion disposed between said first and second ends, said shaft including a longitudinally extending bore therethrough, said shaft being of a predetermined diameter less than the diameter of said bore in said support and having an outer surface provided with a plurality of circumferentially spaced, longitudinally extending grooves and a plurality of recessed areas of predetermined depth;
    (c) a first closure member connected to said support to define in cooperation with said first face, a first chamber, said first chamber being at an average static first pressure;
    (d) a first wheel disposed within said first chamber and connected to said first end of said shaft for rotation therewith, said first wheel being subjected to a first axial force;
    (e) a second closure member connected to said support to define, in cooperation with said second face, a second chamber, said second chamber being at an average static second pressure;
    (f) a second wheel disposed within said second chamber and connected to said second end of said shaft for rotation therewith, said second wheel being subjected to a second axial force;
    (g) a third wheel disposed within said intermediate chamber, said third wheel having first and second faces; and
    (h) equalizing means for substantially equalizing said first and second axial forces upon rotation of said shaft within said bore in said support, whereby said shaft will remain substantially axially centered within said bore in said support, said equalizing means comprising first and second fluid operated thrust bearings provided between said faces of said third wheel and said third and fourth faces of said support respectively.

2. The turbocompressor defined in claim 1 further including first supply means for supplying a seal gas to said longitudinally extending bore of said support.

3. The turbocompressor defined in claim 1 further including first and second supply means for supplying first and second seal gases to said longitudinally extending bore of said support.

4. The turbocompressor as defined in claim 3 in which said first and second seal gases are of the same composition.

5. The turbocompressor as defined in claim 3 in which said faces of said third member are smooth.

6. A turbocompressor comprising:
    (a) a support having a longitudinally extending bore, generally circular in cross section at any point, said bore defining an inner surface, said support being disposed within a fluid atmosphere and including longitudinally spaced first, second, third and fourth faces said third and fourth faces having a recess provided therein which is concentric with said bore and in fluid communication therewith, said third and fourth faces defining an intermediate chamber there between;
    (b) an elongated generally cylindrical shaft rotatable within said bore of said support, said shaft having first and second ends and an intermediate portion disposed between said first and second ends, said shaft including a longitudinally extending bore therethrough, said shaft being of a predetermined diameter less than the diameter of said bore in said support and having an outer surface provided with a plurality of circumferentially spaced, longitudinally extending grooves and a plurality of recessed areas of predetermined depth;

(c) a first closure member connected to said support to define in cooperation with said first face, a first chamber, said first chamber being at an average static first pressure;

(d) a first wheel disposed within said first chamber and connected to said first end of said shaft for rotation therewith, said first wheel being subjected to a first axial force;

(e) a second closure member connected to said support to define, in cooperation with said second face, a second chamber, said second chamber being at an average static second pressure;

(f) a second wheel disposed within said second chamber and connected to said second end of said shaft for rotation therewith, said second wheel being subjected to a second axial force;

(g) a third wheel disposed within said intermediate chamber, said third wheel having first and second faces;

(h) equalizing means for substantially equalizing said first and second axial forces upon rotation of said shaft within said bore in said support, whereby said shaft will remain substantially axially centered within said bore in said support, said equalizing means comprising first and second fluid operated thrust bearings provided between said faces of said third wheel and said third and fourth faces of said support respectively; and (i) first supply means for supplying a first seal gas to said longitudinally extending bore of said support.

7. The turbocompressor as defined in claim 6 further including a second supply means for supplying a second seal gas to said longitudinally extending bore of said support.

8. The turbocompressor as defined in claim 6 in which said faces of said third member are smooth.

9. A turbocompressor as defined in claim 6 in which said seal gas delivered to said intermediate chamber is collected and removed from said intermediate chamber through a separate duct connected thereto.

10. A turbocompressor comprising:

(a) a support having a longitudinally extending bore, generally circular in cross section at any point, said bore defining an inner surface, said support being disposed within a fluid atmosphere and including longitudinally spaced first, second, third and fourth faces, said third and fourth faces having a recess provided therein which is concentric with said bore and in fluid communication therewith, said third and fourth faces being smooth and defining an intermediate chamber there between;

(b) an elongated, generally cylindrical shaft rotatable within said bore of said support, said shaft having first and second ends and an intermediate portion disposed between said first and second ends, said shaft including a longitudinally extending bore therethrough, said shaft being of a predetermined diameter less than the diameter of said bore in said support and having an outer surface provided with a plurality of circumferentially spaced, longitudinally extending grooves and a plurality of recessed areas of predetermined depth;

(c) a first closure member connected to said support to define in cooperation with said first face, a first chamber, said first chamber being at an average static first pressure;

(d) a first wheel disposed within said first chamber and connected to said first end of said shaft for rotation therewith, said first wheel being subjected to a first axial force;

(e) a second closure member connected to said support to define, in cooperation with said second face, a second chamber, said second chamber being at an average static second pressure;

(f) a second wheel disposed within said second chamber and connected to said second end of said shaft for rotation therewith, said second wheel being subjected to a second axial force;

(g) a third wheel disposed within said intermediate chamber, said third wheel having first and second stepped faces;

(h) equalizing means for substantially equalizing said first and second axial forces upon rotation of said shaft within said bore in said support, whereby said shaft will remain substantially axially centered within said bore in said support, said equalizing means comprising first and second fluid operated thrust bearings provided between said faces of said third wheel and said third and fourth faces of said support respectively; and (i) first and second supply means for supplying first and second seal gases to said longitudinally extending bore of said support.

11. A turbocompressor comprising:

(a) a support having a longitudinally extending bore, generally circular in cross section at any point, said bore defining an inner surface, said support being disposed within a fluid atmosphere and including longitudinally spaced first, second, third and fourth faces, said third and fourth faces having a recess provided therein which is concentric with said bore and in fluid communication therewith, said third and fourth faces being smooth and defining an intermediate chamber there between;

(b) an elongated, generally cylindrical shaft rotatable within said bore of said support, said shaft having first and second ends and an intermediate portion disposed between said first and second ends, said shaft including a longitudinally extending bore therethrough, said shaft being of a predetermined diameter less than the diameter of said bore in said support and having an outer surface provided with a plurality of circumferentially spaced, longitudinally extending grooves and a plurality of recessed areas of predetermined depth;

(c) a first closure member connected to said support to define in cooperation with said first face, a first chamber, said first chamber being at an average static first pressure;

(d) a first wheel disposed within said first chamber and connected to said first end of said shaft for rotation therewith, said first wheel being subjected to a first axial force;

(e) a second closure member connected to said support to define, in cooperation with said second face, a second chamber, said second chamber being at an average static second pressure;

(f) a second wheel disposed within said second chamber and connected to said second end of said shaft for rotation therewith, said second wheel being subjected to a second axial force;

(g) a third wheel disposed within said intermediate chamber, said third wheel having first and second faces and including a gas flow aperture communicating between said first and second faces;

(h) equalizing means for substantially equalizing said first and second axial forces upon rotation of said shaft within said bore in said support, whereby said shaft will remain substantially axially centered within said bore in said support, said equalizing means comprising first and second fluid operated thrust bearings provided between said faces of said third wheel and said third and fourth faces of said support respectively; and (i) first supply means for supplying first and second seal gases to said longitudinally extending bore of said support.

12. A turbocompressor comprising:

(a) a support having a longitudinally extending bore, generally circular in cross section at any point, said bore defining an inner surface, said support being disposed within a fluid atmosphere and including longitudinally spaced first, second, third and fourth faces, said third and fourth faces having a recess provided therein which is concentric with said bore and in fluid communication therewith, said third and fourth faces being smooth and defining an intermediate chamber there between;

(b) an elongated, generally cylindrical shaft rotatable within said bore of said support, said shaft having first and second ends and an intermediate portion disposed between said first and second ends, said shaft including a longitudinally extending bore therethrough, said shaft being of a predetermined diameter less than the diameter of said bore in said support and having an outer surface provided with a plurality of circumferentially spaced, longitudinally extending grooves and a plurality of recessed areas of predetermined depth;

(c) a first closure member connected to said support to define in cooperation with said first face, a first chamber, said first chamber being at an average static first pressure;

(d) a first wheel disposed within said first chamber and connected to said first end of said shaft for rotation therewith, said first wheel being subjected to a first axial force;

(e) a second closure member connected to said support to define, in cooperation with said second face, a second chamber, said second chamber being at an average static second pressure;

(f) a second wheel disposed within said second chamber and connected to said second end of said shaft for rotation therewith, said second wheel being subjected to a second axial force;

(g) a third wheel disposed within said intermediate chamber, said third wheel having first and second stepped faces;

(h) equalizing means for substantially equalizing said first and second axial forces upon rotation of said shaft within said bore in said support, whereby said shaft will remain substantially axially centered within said bore in said support, said equalizing means comprising first and second fluid operated thrust bearings provided between said faces of said third wheel and said third and fourth faces of said support respectively; and (i) first and second supply means for supplying first and second seal gases to said longitudinally extending bore of said support.

13. A turbocompressor comprising:

(a) a support having a longitudinally extending bore, generally circular in cross section at any point, said bore defining an inner surface, said support being disposed within a fluid atmosphere and including longitudinally spaced first, second, third and fourth faces, said third and fourth faces having a recess provided therein which is concentric with said bore and in fluid communication therewith, said third and fourth faces being smooth and defining an intermediate chamber there between;

(b) an elongated, generally cylindrical shaft rotatable within said bore of said support, said shaft having first and second ends and an intermediate portion disposed between said first and second ends, said shaft including a longitudinally extending bore therethrough, said shaft being of a predetermined diameter less than the diameter of said bore in said support and having an outer surface provided with a plurality of circumferentially spaced, longitudinally extending grooves and a plurality of recessed areas of predetermined depth;

(c) a first closure member connected to said support to define in cooperation with said first face, a first chamber, said first chamber being at an average static first pressure;

(d) a first wheel disposed within said first chamber and connected to said first end of said shaft for rotation therewith, said first wheel being subjected to a first axial force;

(e) a second closure member connected to said support to define, in cooperation with said second face, a second chamber, said second chamber being at an average static second pressure;

(f) a second wheel disposed within said second chamber and connected to said second end of said shaft for rotation therewith, said second wheel being subjected to a second axial force;

(g) a third wheel disposed within said intermediate chamber, said third wheel having first and second faces;

(h) equalizing means for substantially equalizing said first and second axial forces upon rotation of said shaft within said bore in said support, whereby said shaft will remain substantially axially centered within said bore in said support, said equalizing means comprising first and second fluid operated thrust bearings provided between said faces of said third wheel and said third and fourth faces of said support respectively;

(i) first and second supply means for supplying first and second seal gases to said longitudinally extending bore of said support; and (j) third means for supplying gas to said longitudinally extending bore of said support.

* * * * *